United States Patent
Hardesty et al.

(10) Patent No.: US 6,438,839 B1
(45) Date of Patent: Aug. 27, 2002

(54) METHOD OF MANUFACTURING A CATALYTIC CONVERTER BY INDUCTION WELDING

(75) Inventors: Jeffrey B. Hardesty, Byron; John C. Boehnke, Grand Blanc, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/771,466

(22) Filed: Jan. 26, 2001

(51) Int. Cl.[7] .............................................. B23P 15/00
(52) U.S. Cl. ........................................ 29/890; 219/617
(58) Field of Search ........................... 29/890; 219/600, 219/602, 603, 604, 607, 612, 617

(56) References Cited

U.S. PATENT DOCUMENTS

| | | |
|---|---|---|
| 3,088,200 A | 5/1963 | Birdsall et al. |
| 3,258,573 A | 6/1966 | Morin et al. |
| 3,407,637 A | 10/1968 | Dietz et al. |
| 3,447,350 A | 6/1969 | Schenk |
| 3,520,049 A | 7/1970 | Lysenko et al |
| 4,413,392 A * | 11/1983 | Otani et al. .................. 219/119 |
| 4,531,393 A | 7/1985 | Weir |
| 4,619,137 A | 10/1986 | Sano et al. |
| 4,656,713 A * | 4/1987 | Rosa et al. .................. 138/113 |
| 4,864,095 A * | 9/1989 | Yamashita et al. ....... 219/86.24 |
| 5,671,522 A | 9/1997 | Aronne |
| 5,813,264 A | 9/1998 | Steingroever |
| 5,826,320 A | 10/1998 | Rathke et al. |
| 5,966,813 A | 10/1999 | Durand ...................... 29/897.2 |
| 5,981,921 A | 11/1999 | Yablochnikov ............. 219/603 |
| 6,065,317 A | 5/2000 | Steingroever |
| 6,104,012 A | 8/2000 | Durand ........................ 219/617 |
| 6,229,125 C1 | 5/2001 | Livshiz et al. |

* cited by examiner

*Primary Examiner*—I. Cuda-Rosenbaum
(74) *Attorney, Agent, or Firm*—Vincent A. Cichosz

(57) ABSTRACT

A method for manufacturing a catalytic converter comprising disposing a first end around a second end and disposing an induction coil around the first end. Discharging a current through the induction coil and forming eddy currents on the surface of the first end. This magnetic impulse welds the first end and the second end together such that the first end disposed around the second end comprises a tube end disposed around an end of a catalytic converter or such that the first end disposed around the second end comprises the catalytic converter end disposed around the tube end. The method can be used to weld pieces of the catalytic converter, as well as sizing the catalytic converter for a desired mat density.

8 Claims, 4 Drawing Sheets

METHOD OF MANUFACTURING A CATALYTIC CONVERTER BY INDUCTION WELDING

TECHNICAL FIELD

This disclosure relates to a method of manufacturing a catalytic converter.

BACKGROUND

Catalytic converters are typically employed for the oxidation of carbon monoxide and hydrocarbons and the reduction of oxides of nitrogen in automobile exhaust gas streams. A catalyst disposed on a frangible substrate is supported within the catalytic converter to facilitate the oxidation and reduction process of the exhaust gas stream. During operation, the exhaust gases pass over the substrate and contact the catalyst where the amount of hydrocarbons, carbon monoxide, and oxides of nitrogen are reduced. The temperature of the catalyst is typically between 750° C. and 950° C. and may be higher depending upon the location of the catalytic converter relative to the engine of the automobile. To lessen the effects of this high temperature, a support material cushions and insulates the catalyst material from a housing in which the substrate and catalyst are mounted.

There are several common conventional methods for making catalytic converters; the "clamshell" method, the "tourniquet" method, and the "stuffed" method. In the clamshell method, the internal end-cones and insulative material are cut to conform with each clam shell half, and the halves of the shell are assembled together by a welding process. The catalytic converters made by this method have reduced durability due to the poor control of the mat support material density.

The "tourniquet" method comprises wrapping the shell around the catalyst substrate and support mat assembly. The shell is formed by welding the edges while the assembly is squeezed at rated pressures calculated to optimize the support mat density. The end-cones are then welded to the shell assembly to form the catalytic converter. Although this method also has the disadvantages of increased cost due to the number of components that have to be processed and also the added cost of welding wires and gases, it claims improved mat density control.

The "stuffed" (with welded end-cone assemblies) method comprises wrapping the catalyst substrate in the insulative support material and stuffing it, under pressure, into a preformed round shell. The end-cone assemblies with the insulating material are fitted and welded to the shell assembly to form the catalytic converter. Conventional welding techniques have been commonly used to form these catalytic converters.

Conventional welding techniques involve the application of heat to localized areas of two metallic workpieces, which results in a uniting of the two workpieces. This type of welding may or may not be performed with the application of pressure, and may or may not include the use of a filler material. The drawbacks of conventional welding techniques include the creation of a high amount of heat that risks damage to the parts being welded. Another drawback is that dissimilar metals and workpieces of different gauge thicknesses cannot be joined, thereby limiting the materials used in forming catalytic converters. Lastly, these conventional techniques are expensive since they require a welding process that consumes welding wires and costly welding gases.

Accordingly, there remains a need in the art for a method for manufacturing a catalytic converter that is easily welded and cost effective.

SUMMARY

The deficiencies of the prior art are overcome or alleviated by the method of producing a catalytic converter.

A method for manufacturing a catalytic converter comprising disposing a first end around a second end and disposing an induction coil around the first end. Discharging a current through the induction coil and forming eddy currents on the outer surface of the first end. This magnetic impulse welds the first end and the second end together such that the first end disposed around the second end comprises a tube end disposed around an end of a catalytic converter or such that the first end disposed around the second end comprises the catalytic converter end disposed around the tube end.

A method for manufacturing a catalytic converter, comprising disposing a catalyst substrate, surrounded by a mat support material, within a shell and disposing an induction coil around the shell. Discharging a current through the induction coil and forming eddy currents on the surface of the shell. Magnetic impulse sizing the shell about the mat support material to size the shell to the mat support material.

A method for manufacturing a catalytic converter comprising disposing a first end around a second end and disposing an induction coil around the first end. Discharging a current through the induction coil and forming eddy currents on the surface of the first end. Magnetic impulse welding the first end and the second end together such that the first end disposed around the second end comprises an endplate end disposed around an end of a shell or wherein the first end disposed around the second end comprises the shell end disposed around the endplate end.

BRIEF DESCRIPTION OF THE DRAWINGS

Referring now to the figures, which are meant to be exemplary, not limiting, and wherein like elements are numbered alike in several figures, in which.

DETAILED DESCRIPTION OF THE PREFERRED EMBODIMENTS

A catalytic converter, for use in an engine emissions control system, generally has a catalyst substrate with a catalyst that can be concentrically disposed within a shell. A mat support or insulating material can be disposed concentrically around the catalyst substrate adjacent to the shell. For "stuffed" catalytic converters, the catalyst substrate is wrapped in the insulative support material and stuffed under pressure into a preformed, typically round, shell. The end cone assemblies, endplate, exhaust manifold, or the like, with the insulating material, are fitted and welded to the shell assembly to form the catalytic converter.

Figure 1:
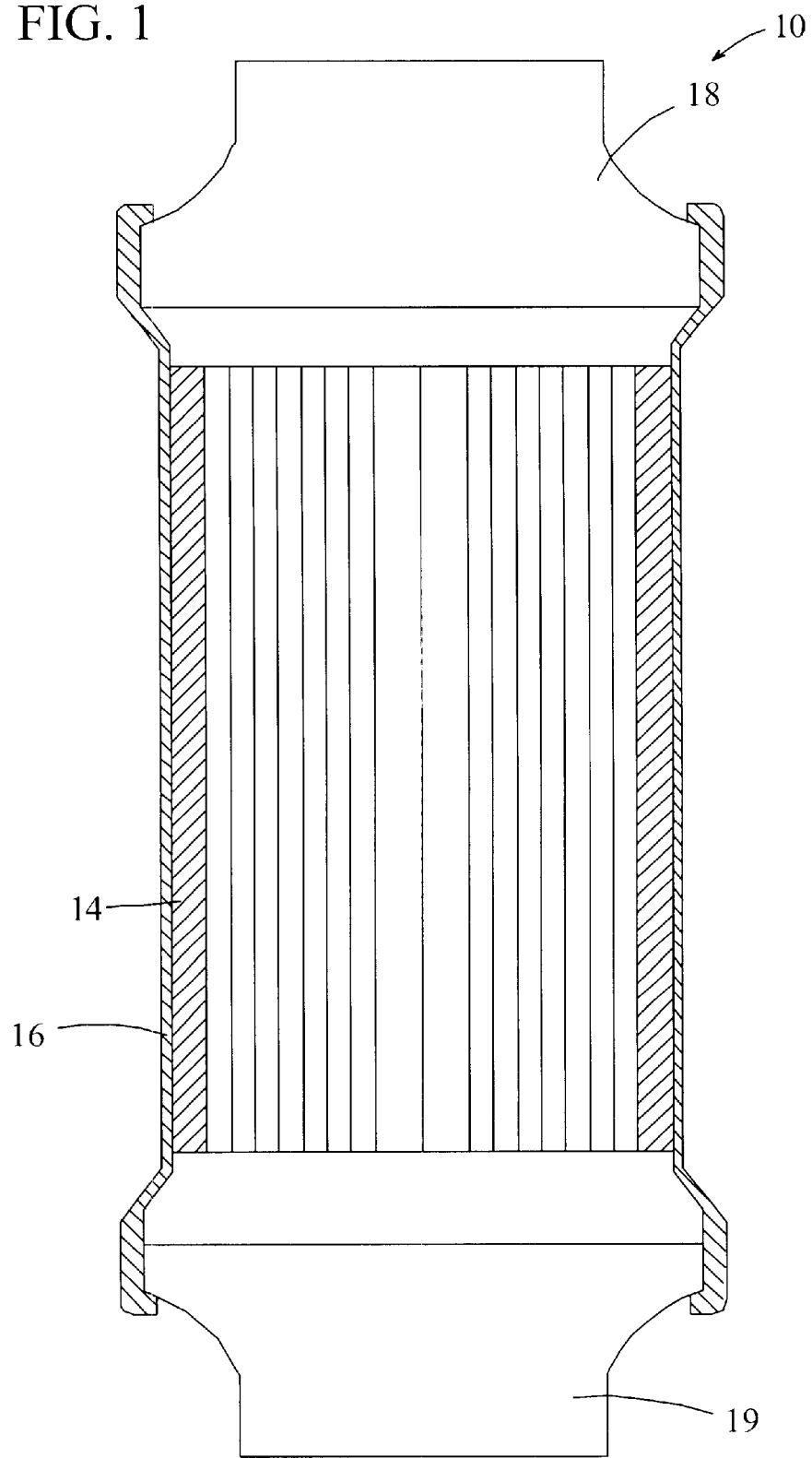
FIG. 1 is cross sectional side view of an exemplary catalytic converter.

Referring to FIG. 1, the catalytic converter 10 contains a catalyst support material (or substratum, or substrate) 12 disposed within a mat support (or insulating material) 14 and further disposed within a shell 16. Two endpieces (end cones, exhaust manifolds, or endplates) 18, 19 are attached to the shell 16 on either end of the catalytic converter 10.

The catalyst substrate 12 can comprise any material designed for use in a spark ignition or diesel engine environment and have the following characteristics: (1) capable of operating at temperatures up to about 1000° C.; (2) capable of withstanding exposure to hydrocarbons, nitrogen oxides, carbon monoxide, carbon dioxide, and/or sulfur; and (3) having sufficient surface area and structural integrity to support the desired catalyst. Some possible catalyst substrate materials include cordierite, silicon carbide, metallic foils, alumina sponges, porous glasses, and the like, and mixtures comprising at least one of the foregoing materials.

Although the catalyst substrate 12 can have any size or geometry, the size and geometry are preferably chosen to optimize the surface area in the given converter design parameters. Typically, the catalyst substrate has a honeycomb geometry, with the combs being any multi-sided or rounded shape, with substantially square, hexagonal, octagonal or similar geometries preferred due to the ease of manufacturing and increased surface area. Furthermore, the catalyst substrate can comprise various overall, rounded or multi-sided crosssectional sectional geometries such as round, elliptical, hexagonal, octagonal, and the like. Catalyst substrates may also have various peaks and valley surface features.

The catalyst substrate 12 will preferably have the greatest number of cells that is structurally feasible so that the inner surface area of catalyst substrate is maximized. The surface area of catalyst substrate should also be sufficient to support a sufficient amount of catalyst(s) to effectively catalyze exhaust gas streams flowing therethrough, with the surface area being a function of the surface design of gas passages, the volume of the substrate, and the effective density of the substrate. These parameters may be adjusted according to the design needs, taking into account both the desired shape of the catalytic converter and optimal paths for exhaust gas flow.

Disposed on and or throughout the catalyst substrate 12 is a catalyst for converting exhaust gases to acceptable emission levels as is known in the art. The catalyst material can be applied over the entire surface area or selected portions depending upon the several factors, including the structure of the catalyst substrate, the catalyst's properties, cost, catalyzing reaction conditions, gas passageway flow conditions, and the like. The catalyst may comprise one or more catalyst materials that are wash coated, imbibed, impregnated, physiorbed, chemisorbed, precipitated, or otherwise applied to the catalyst substrate. Possible catalyst materials include metals, such as platinum, palladium, rhodium, iridium, osmium, ruthenium, tantalum, zirconium, yttrium, cerium, nickel, copper, and the like, as well as mixtures, oxides, and alloys comprising at least one of the foregoing catalyst materials, and other conventional catalysts. Disposed around and concentric with catalyst substrate 12 is a mat support material 14 that provides support to the catalyst substrate 12 during operation of the catalytic converter 10 and thermal insulation for the shell 16. The mat support material may be any material capable of insulating the catalyst substrate and preferably capable of holding the catalyst substrate in the desired location while being inserted into a shell. The mat support material can be a formed fibrous material containing vermiculite, refractory ceramic fibers, organic binders, and other conventional materials, as well as combinations comprising at least one of the foregoing materials. The mat support material can either be a simple non-expanding ceramic material, or an intumescent material, e.g., one which contains a vermiculite component that expands with heating to maintain firm compression when the outer steel expands outward from the catalyst substrate, as well as material which include a combination of both.

The thickness of mat support material 14 will be dependent upon the temperature of the exhaust gas and the catalytic converter's application. For instance, the catalytic converter for a spark ignition environment will require a mat support material having a thickness that differs from the catalytic converter operating in a diesel environment. As the exhaust gas temperature range increases, the thickness of mat support material 14 typically increases accordingly to meet customer skin temperature requirements. Generally, the mat support material thickness is about 2 millimeters (mm) to about 12 mm preferred for most automotive applications. Additionally, the peripheral dimensions of each catalyst substrate and customer skin temperature requirements will determine the preferred length and width of the mat support material.

The mat support material 14 is disposed concentrically within the shell 16. Suitable materials for the shell can comprise any material that is capable of resisting under-car salt, temperature and corrosion. Some ferritic materials, such as, stainless steels including the 400 series, e.g., grades SS-409, SS-439, and SS-441, are generally preferred. The choice of material depends upon the type of exhaust gas, the maximum temperature of the gas and catalyst substrate, and the like.

Figure 2:
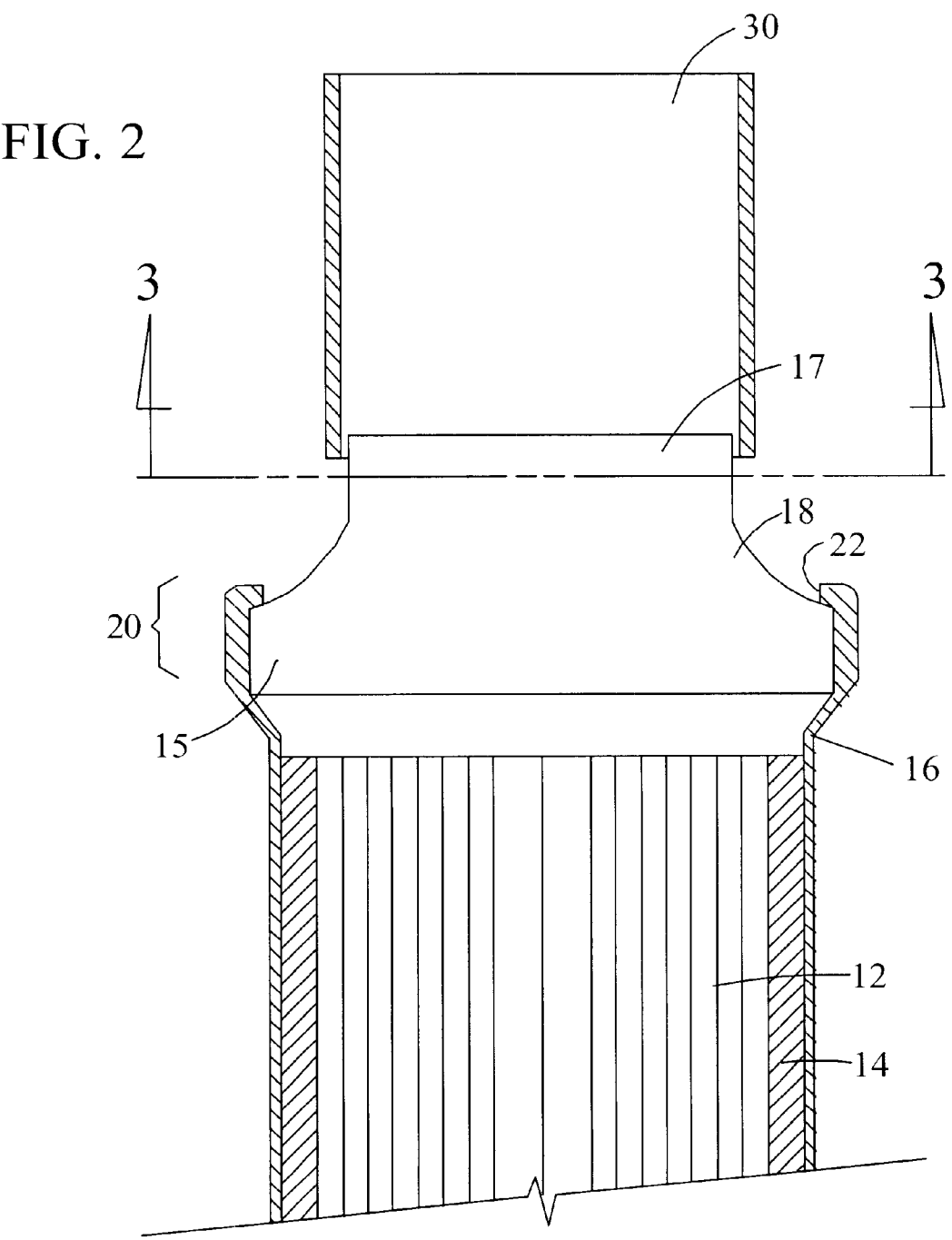
FIG. 2 is a partial side view of an exemplary catalytic converter with a pipe.

Referring now to FIG. 2, a portion of a catalytic converter 10 is illustrated. The shell 16 comprises an end 20 that can be joined with a first portion 15 of endplate 18. The shell 16 can be joined with the endplate 18 at weld joint(s) 22, such that the end 20 can be disposed around, about, surround, or encompass the first portion 15 of endplate 18. An alternative embodiment includes having an endplate disposed around, about, surrounding, or encompassing a shell. A second portion 17 of endplate 18 can further connect with a pipe, cylinder, conduit, duct, or tube 30. Tube 30 can be disposed around (as shown in FIG. 2) or within the second portion 17 of endplate 18. The joining of these items can be achieved by any conventional welding practice, as well as by magnetic impulse (or pulse) welding.

Magnetic impulse welding is based on the use of the interaction of magnetic fields produced by an inductor through which an impulse of high intensity current is passed. The parts to be welded are positioned in spaced relation to one another. This method can be used for obtaining overlapping welded joints of thin-walled parts having different thicknesses and made from different materials without melting.

Figure 3:
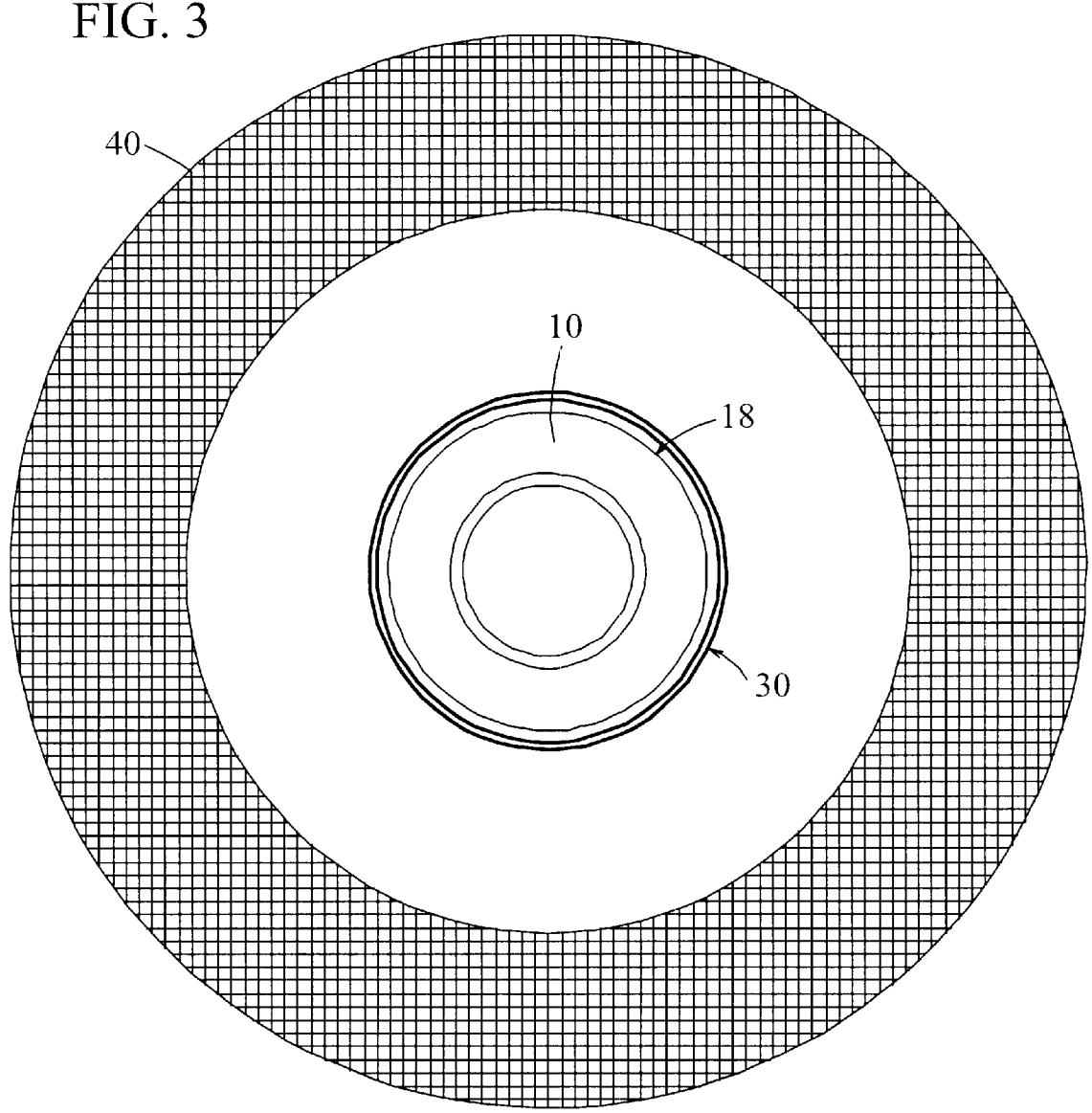
FIG. 3 is a cross sectional view of an exemplary catalytic converter, taken along lines 3—3 of FIG. 2.

In the process of magnetic impulse welding, the surfaces of metals approach each other and collide with high relative velocity. To magnetic impulse weld a catalytic converter, a magnetic impulse welding apparatus including a capacitor bank, an inductor, and a high current switching device can be used. Referring to FIG. 3, a cross sectional view of a catalytic converter 10 and a tube 30, taken along lines 3—3 of FIG. 2, within an inductor or induction coil 40 is provided. The tube 30 is positioned around the endplate 18, such that the tube 30 has a larger diameter than endplate 18. In the alternative, the endplate 18 can be placed around the tube 30, such that the endplate 18 has a larger diameter than the tube 30. During welding, a current can be discharged through the induction coil 40 to create eddy currents on the surface of the tube 30. The magnetic force collapses the tube 30 at a speed sufficient to collapse the tube 30 onto the endplate 18, creating a weld. Multiple welds can be completed on the same workpiece. For example, the endplate 18 can be welded to the shell 16, as illustrated in FIG. 2 at the weld joint 22 or in the alternative, the endplate 18 can be welded around shell 16.

This method requires a current created in the induction coil of greater than about 750,000 amperes, with up to about 1,000,000 amperes preferred. Generally, the time to weld using this method is less than about 50 milliseconds. This method can be used to join two workpieces made of steel, however it may also be used to join dissimilar materials, such as steel to aluminum.

Figure 4:
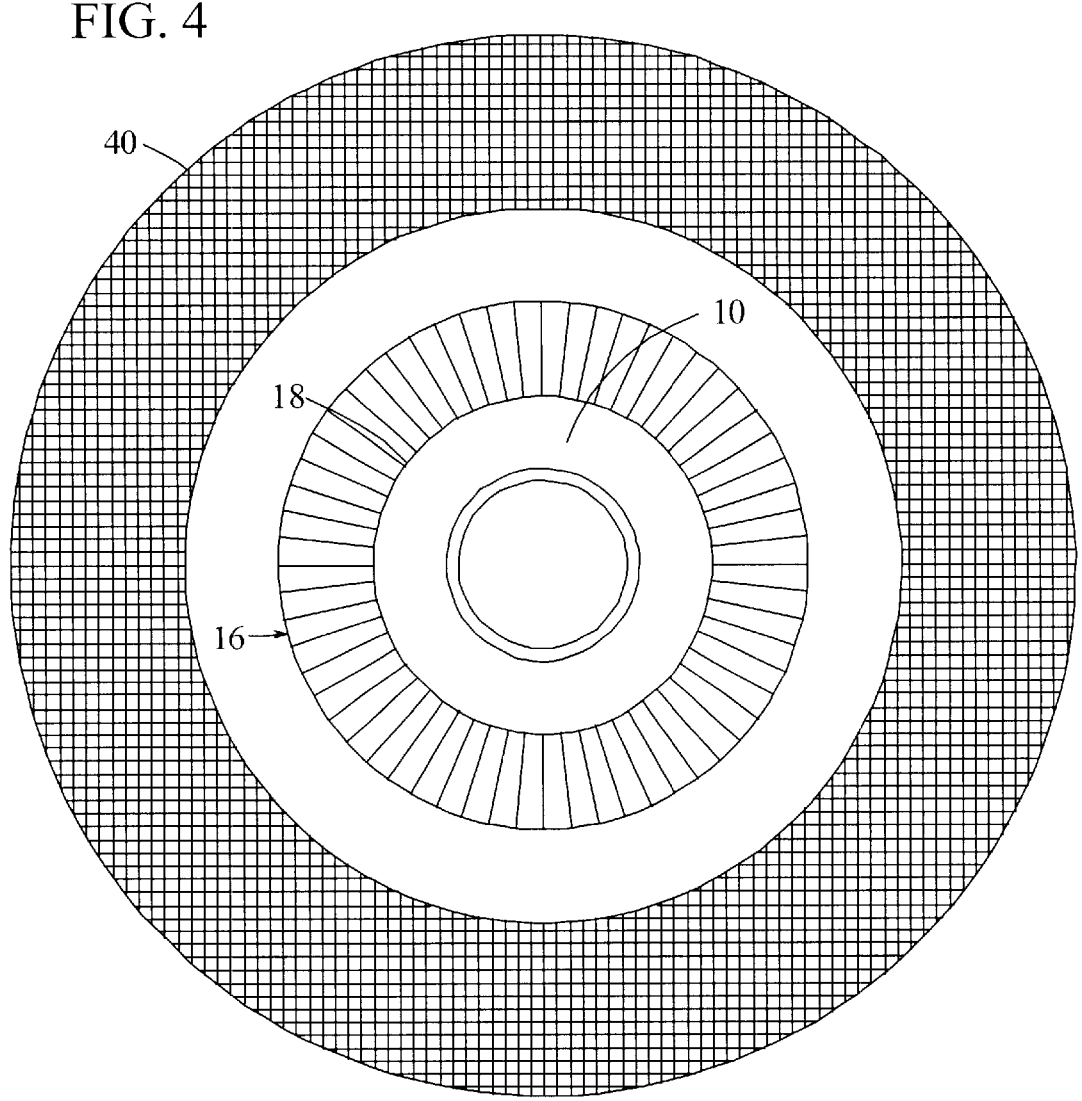
FIG. 4 is a cross sectional view of an exemplary catalytic converter, taken along lines 3—3 of FIG. 2.

This method of magnetic impulse welding can also be used to size the shell onto the mat support material surrounding the catalyst substrate to produce a desired mat density within the catalytic converter. As illustrated in FIG. 4, the catalytic converter 10 is placed into an induction coil 40. A current is discharged through the induction coil 40 to create eddy currents on the surface of shell 16. The magnetic field will shrink or collapse the shell 16 about the mat support material. This process removes the problems associated with mechanical sizing, for example, tool wear, part contamination, measuring problems or expense.

This method employs a current created in the induction coil of greater than about 200,000 amperes, with up to about 300,000 amperes preferred. Generally, the force created is sufficient to shrink the shell about the mat support material. The time to size a workpiece using this method is less than about 50 microseconds. This method of producing a catalytic converter will solve the problems of costly and time consuming manufacturing processes. This process is high precision allowing for greater control (repeatability). It can also be used to join round objects or dissimilar metals. Magnetic impulse welding creates a strong attachment between materials and springback is minimal since there is a permanent deformation of the materials. This process requires no filler materials and takes much less time to complete than the conventional welding process, while generating little or no heat. Use of magnetic impulse welding also provides the benefit of welding and sizing of the catalytic converter at the same station.

While preferred embodiments have been shown and described, various modifications and substitutions may be made thereto without departing from the spirit and scope of the invention. Accordingly, it is to be understood that the apparatus and method have been described by way of illustration only, and such illustrations and embodiments as have been disclosed herein are not to be construed as limiting to the claims.

What is claimed is:

1. A method for manufacturing a catalytic converter, comprising:

disposing a first end around a second end;

disposing an induction coil around the first end;

discharging a current through said induction coil;

forming eddy currents on the surface of said first end; and magnetic impulse welding said first end and said second end together; wherein said first end disposed around said second end comprises a tube end disposed around an end of a catalytic converter or wherein said first end disposed around said second end comprises said catalytic converter end disposed around said tube end.

2. The method of claim 1, further comprising creating an annular gap between said catalytic converter and said tube.

3. The method of claim 1, further comprising disposing a catalyst substrate surrounded by a mat support material within a shell; disposing said induction coil around said shell; and collapsing said shell about said mat support material at a velocity sufficient to size said shell to said mat support material by magnetic impulse.

4. The method of claim 1, further comprising disposing an open end of a shell into an open end of an endplate; disposing said induction coil around said endplate adjacent to said open end of said shell; and collapsing said shell about said endplate at a velocity sufficient to magnetic impulse weld said shell with said endplate.

5. A method for manufacturing a catalytic converter, comprising:

disposing a catalyst substrate, surrounded by a mat support material, within a shell;

disposing an induction coil around said shell;

discharging a current through said induction coil;

forming eddy currents on the surface of said shell; and magnetic impulse welding said shell about said mat support material to size said shell to said mat support material.

6. A method for manufacturing a catalytic converter comprising:

disposing a first end around a second end;

disposing an induction coil around the first end;

discharging a current through said induction coil;

forming eddy currents on the surface of said first end; and magnetic impulse welding said first end and said second end together; wherein said first end disposed around said second end comprises an endplate end disposed around an end of a shell or wherein said first end disposed around said second end comprises said shell end disposed around said endplate end.

7. The method of claim 6, further comprising creating an annular gap between said shell and said endplate.

8. The method as in claim 6, wherein said shell contains a catalyst substrate with a catalyst material surrounded by a mat support material.

\* \* \* \* \*